(12) United States Patent
Lee et al.

(10) Patent No.: US 11,235,741 B2
(45) Date of Patent: Feb. 1, 2022

(54) VEHICLE AND CONTROL METHOD FOR THE SAME

(71) Applicants: HYUNDAI MOTOR COMPANY, Seoul (KR); KIA MOTORS CORPORATION, Seoul (KR)

(72) Inventors: Sangyeob Lee, Seongnam-si (KR); Ilhwan Kim, Hwaseong-si (KR); Donghyuk Kim, Hwaseong-si (KR); Kyung-joo Bang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 16/598,865

(22) Filed: Oct. 10, 2019

(65) Prior Publication Data
US 2020/0353904 A1 Nov. 12, 2020

(30) Foreign Application Priority Data
May 8, 2019 (KR) .................... 10-2019-0053686

(51) Int. Cl.
| | |
|---|---|
| *B60T 7/22* | (2006.01) |
| *B60Q 9/00* | (2006.01) |
| *B60Q 5/00* | (2006.01) |
| *G01S 13/86* | (2006.01) |
| *G01S 13/93* | (2020.01) |
| *G01S 13/931* | (2020.01) |

(52) U.S. Cl.
CPC ................ *B60T 7/22* (2013.01); *B60Q 5/006* (2013.01); *B60Q 9/008* (2013.01); *G01S 13/867* (2013.01); *G01S 13/931* (2013.01); *G01S 2013/93185* (2020.01)

(58) Field of Classification Search
CPC ........... B60T 7/22; B60Q 5/006; B60Q 9/008; G01S 13/867; G01S 13/931; G01S 2013/93185
See application file for complete search history.

(56) References Cited

U.S. PATENT DOCUMENTS

| | | | | |
|---|---|---|---|---|
| 5,939,976 | A | * 8/1999 | Sasaki | .................... G08G 1/164 340/435 |
| 2008/0097699 | A1 | * 4/2008 | Ono | .................... B62D 15/0265 701/300 |
| 2011/0095907 | A1 | * 4/2011 | Kushi | .................... G08G 1/164 340/905 |

(Continued)

FOREIGN PATENT DOCUMENTS

KR 10-2018-0040014 A 4/2018

*Primary Examiner* — Peter D Nolan
*Assistant Examiner* — Demetra R Smith-Stewart
(74) *Attorney, Agent, or Firm* — Slater Matsil, LLP

(57) ABSTRACT

A vehicle and a control method of the same are provided. The vehicle may include a braking, a camera configured to capture an image of a front side of the vehicle and obtain image data, a radar configured to obtain radar data including distance information with respect to another vehicle traveling in an opposite direction at an intersection and speed information of the other vehicle, and a controller configured to estimate a collision risk on a side of the other vehicle based on the image data and the radar data when the vehicle is turning at the intersection, and control the brake based on the collision risk on the side of the other vehicle.

18 Claims, 10 Drawing Sheets

(56) References Cited

U.S. PATENT DOCUMENTS

| | | | |
|---|---|---|---|
| 2011/0095909 A1* | 4/2011 | Kushi | G08G 1/161 |
| | | | 340/905 |
| 2016/0335892 A1* | 11/2016 | Okada | G08G 1/123 |
| 2017/0072853 A1* | 3/2017 | Matsuoka | G08G 1/166 |
| 2020/0410851 A1* | 12/2020 | Saito | H04W 4/06 |
| 2021/0046924 A1* | 2/2021 | Caldwell | B60W 60/0011 |

* cited by examiner

| TYPE | WIDTH (Lx)(mm) | HEIGHT (Lz)(mm) | AREA (WIDTH*HEIGHT) | OVERALL LENGTH (Ly)(mm) |
|---|---|---|---|---|
| TRUCK | 2490 | 3260 | 2490*3260 | 10275~12320 |
| BUS | 2495 | 3385 | 2495*3385 | 11730 |
| SMALL SIZE VEHICLE | 1595 | 1485 | 1595*1485 | 3595 |
| MEDIUM SIZE VEHICLE | 1800 | 1440 | 1800*144 | 4620 |
| LARGE SIZE VEHICLE | 1890 | 1480 | 1890*1480 | 4990 |
| SUV | 1975 | 1750 | 1975*1750 | 4980 |

VEHICLE AND CONTROL METHOD FOR THE SAME

CROSS-REFERENCE TO RELATED APPLICATION(S)

The present application claims priority to and the benefit of Korean Patent Application No. 10-2019-0053686, filed on May 8, 2019, which is incorporated herein by reference in its entirety.

TECHNICAL FIELD

The present disclosure relates to a vehicle and a control method for reducing collision with other vehicles upon turning at an intersection.

BACKGROUND

The statements in this section merely provide background information related to the present disclosure and may not constitute prior art.

The intersection collision avoidance system is a system that prevents collision when a collision is expected with a vehicle crossing by using a brake device. In general, the prior art predicts a collision point based on the speed of the vehicle and the speed of the other vehicle at the intersection when determining the collision risk, and brakes the vehicle when the collision risk is high.

However, the prior art can avoid the frontal collision with the other vehicle facing the intersection, but it may be difficult to reduce the collision on the side of the other vehicle because it does not consider the length of the other vehicle.

SUMMARY

One aspect of the present disclosure provides a vehicle and a control method thereof capable of reducing a collision on the side of another vehicle facing an intersection.

In another aspect of the present disclosure, a vehicle includes a braking device; a camera configured to photograph a front and obtain image data; and a radar configured to obtain radar data including distance information with other vehicle coming at an intersection and speed information of the other vehicle; and a controller configured to estimate a collision risk on side of the other vehicle based on the image data and the radar data when the vehicle is turning at the intersection, and controls the braking device based on the collision risk on the side of the other vehicle.

The controller may estimate an overall length of the other vehicle based on the image data and the radar data, and estimate time to pass (TTP) of the other vehicle.

The controller may estimate that there is the collision risk on the side of the other vehicle when steering angle exceeds a predetermined reference steering angle before the time to pass (TTP) passes by the other vehicle.

The controller may obtain a width and a height of the other vehicle based on the image data and the radar data, and may estimate the overall length of the other vehicle based on the width and the height of the other vehicle.

The controller may determine the overall length of the other vehicle with reference to an overall length data table stored in a memory.

The controller may estimate the time to pass (TTP) of the other vehicle from the time when the other vehicle passes a region of interest.

The controller may estimate the time to pass (TTP) of the other vehicle from the time when a longitudinal distance with the other vehicle is a first reference distance.

The controller may control the braking device to release braking of the vehicle after the time to pass (TTP) of the other vehicle passes by the other vehicle.

The vehicle may further include a warning device configured to output a collision warning with the other vehicle.

The warning device may include at least one of an audio device outputting a voice warning message and a display outputting a visual warning message.

In some forms of the present disclosure, a method for controlling a vehicle includes photographing a front and obtaining image data by a camera; and obtaining a radar data including distance information with other vehicle coming at an intersection and speed information of the other vehicle by a radar; estimating a collision risk on side of the other vehicle based on the image data and the radar data when the vehicle is turning at the intersection by a controller; and controlling a braking device based on the collision risk on the side of the other vehicle by the controller.

Estimating the collision risk on side of the other vehicle may include estimating an overall length of the other vehicle based on the image data and the radar data; and estimating time to pass (TTP) of the other vehicle.

Estimating the collision risk on side of the other vehicle may further include estimating that there is the collision risk on the side of the other vehicle when steering angle exceeds a predetermined reference steering angle before the time to pass (TTP) passes by the other vehicle.

Estimating the overall length of the other vehicle may include obtaining a width and a height of the other vehicle based on the image data and the radar data; and estimating the overall length of the other vehicle based on the width and the height of the other vehicle.

Estimating the overall length of the other vehicle may further include determining the overall length of the other vehicle with reference to an overall length data table stored in a memory.

Estimating the time to pass (TTP) of the other vehicle may include estimating the time to pass (TTP) of the other vehicle from the time when the other vehicle passes a region of interest.

Estimating the time to pass (TTP) of the other vehicle may include estimating the time to pass (TTP) of the other vehicle from the time when a longitudinal distance with the other vehicle is a first reference distance.

The method may further include controlling the braking device to release braking of the vehicle after the time to pass (TTP) of the other vehicle passes by the other vehicle.

The method may further include outputting a collision warning with the other vehicle by a warning device.

Outputting a collision warning with the other vehicle may include outputting at least one of a voice warning message by an audio apparatus and a visual warning message by a display.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
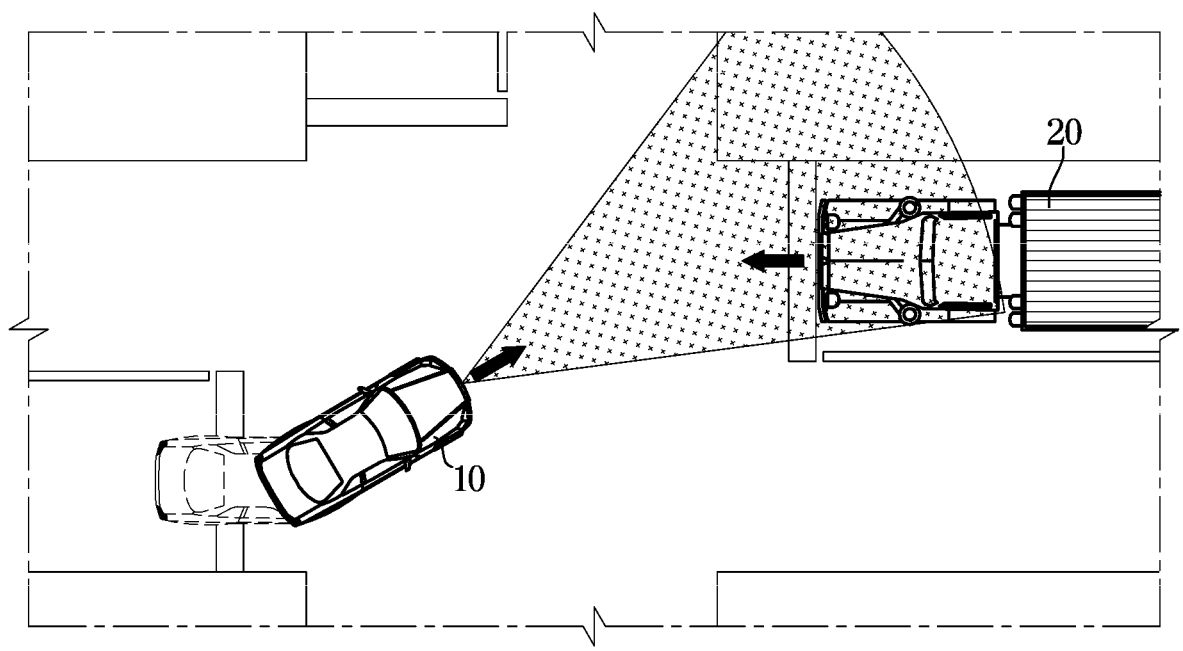
FIG. 1 is a view for explaining the detection of other vehicles coming when a vehicle is turning at an intersection.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms such as "unit", "module", "member", and "block" may be embodied as hardware or software. In some forms of the present disclosure, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, some forms of the present disclosure will be described with reference to the accompanying drawings.

Figure 2:
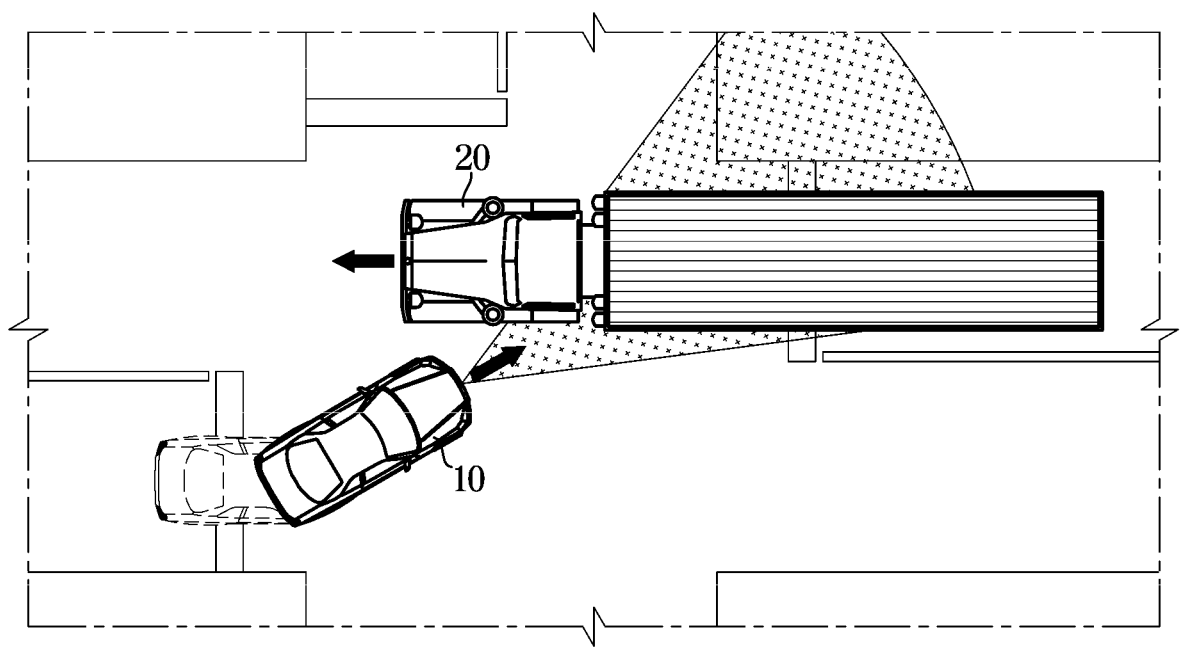
FIG. 2 is a view for explaining the collision with side of other vehicle coming when a vehicle is turning at an intersection.

FIG. 1 is a view for explaining the detection of other vehicles coming when a vehicle is turning at an intersection. FIG. 2 is a view for explaining the collision with side of other vehicle coming when a vehicle is turning at an intersection.

Referring to FIG. 1, When the vehicle 10 turns at the intersection, the vehicle 10 may detect or identify an oncoming other vehicle 20 and avoid a collision. However, Referring to FIG. 2, since the prior art does not consider the overall length of the other vehicle 20 oncoming the intersection, there is a risk of colliding against the side of the other vehicle 20. For example, when the other vehicle 20 is a bus or a truck, since the overall length is relatively longer than that of a general vehicle, if the vehicle 10 turns while the other vehicle 20 does not pass completely, it may collide with the other vehicle 20.

Therefore, by estimating or predicting the overall length of the other vehicle 20 and estimating the time that the other vehicle 20 passes by the side of the vehicle 10, it is possible to prevent a collision on the side of the other vehicle 20. Hereinafter, a method of avoiding a collision with the side of the other vehicle 20 facing at the intersection will be described in detail.

Figure 3:
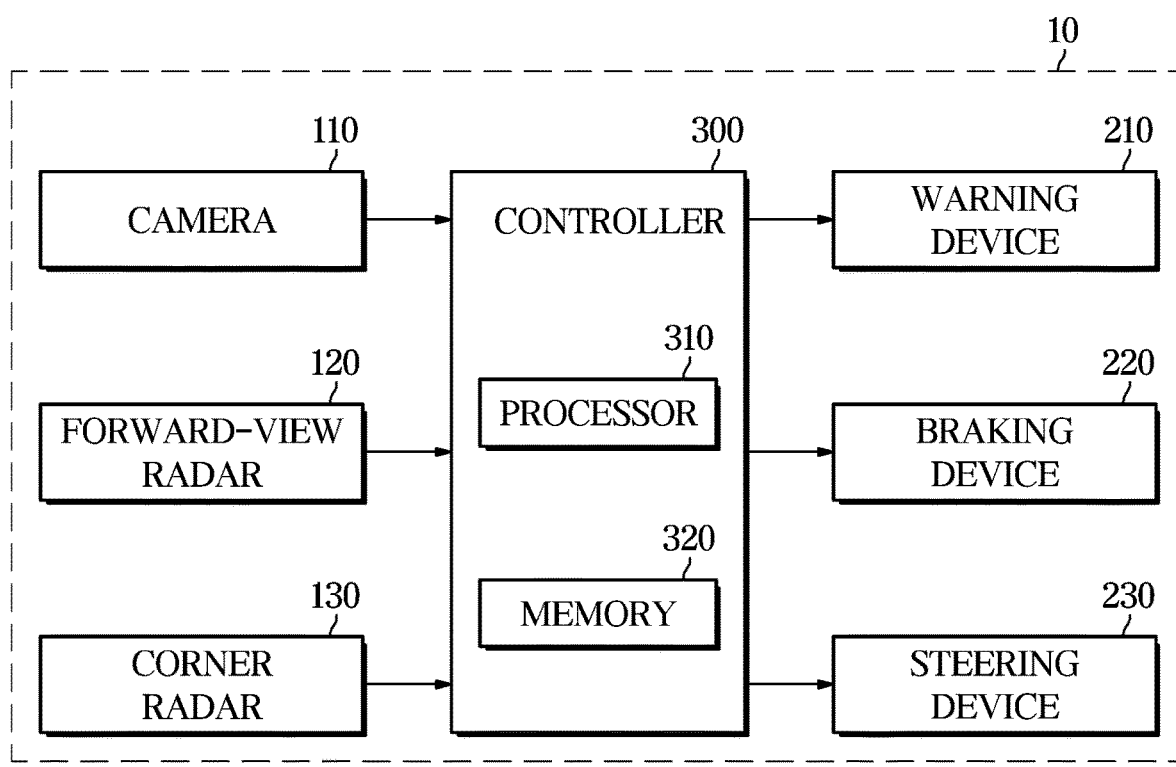
FIG. 3 shows a configuration of a vehicle in one form of the present disclosure.

FIG. 3 shows a configuration of a vehicle in some forms of the present disclosure.

Referring to FIG. 3, the vehicle 10 in some forms of the present disclosure may include a camera 110, a forward-view radar 120, a corner radar 130, a warning device 210, a braking device 220, a steering device 230, and a controller 300. The controller 300 may control various devices included in the vehicle 10.

The vehicle 10 also includes an engine and a transmission. The engine includes a cylinder and a piston and can generate power for the vehicle 10 to travel. The transmission includes a plurality of gears and can transmit power generated by the engine to the wheels. The braking device 220 may decelerate the vehicle 10 or stop the vehicle 10 through friction with the wheels. The steering device 230 may change the driving direction of the vehicle 10.

The vehicle 10 may include a plurality of electronic constituent elements. For example, the vehicle 10 may further include an Engine Management System (EMS), a Transmission Controller also referred to as a Transmission Control Unit (TCU), an Electronic Brake Controller also referred to as an Electronic Brake Control Module (EBCM), an Electronic Power Steering (EPS) device, a Body Control Module (BCM), and a Driver Assistance System (DAS).

The EMS may control the engine in response to either the driver's acceleration intention from the acceleration pedal or a request signal from the driver assistance system (DAS). For example, the EMS may control torque of the engine.

The TCU may control the transmission in response to either a driver's gearshift command activated by a gearshift lever and/or a driving speed of the vehicle. For example, the TCU may adjust or regulate a gearshift ratio from the engine 10 to wheels of the vehicle.

The electronic brake control module (EBCM) may control a brake device 220 in response to either the driver's brake intention from a brake pedal or slippage of wheels. For example, the EBCM may temporarily release wheel braking in response to wheel slippage detected in a braking mode of the vehicle 10, resulting in implementation of an Anti-lock Braking System (ABS). The EBCM may selectively release braking of wheels in response to oversteering and/or understeering detected in a steering mode of the vehicle 10, resulting in implantation of Electronic Stability Control (ESC). In addition, the EBCM may temporarily brake wheels in response to wheel slippage detected by vehicle driving, resulting in implementation of a Traction Control System (TCS).

The electronic power steering (EPS) device may assist the steering device 40 in response to the driver's steering intention from the steering wheel, such that the EPS device may assist the driver in easily handling the steering wheel. For example, the EPS device may assist the steering wheel 40 in a manner that steering force decreases in a low-speed driving mode or a parking mode of the vehicle 10 but increases in a high-speed driving mode of the vehicle 10.

A body control module may control various electronic components that are capable of providing the driver with user convenience or guaranteeing driver safety. For example, the body control module may control headlamps (headlights), wipers, an instrument or other cluster, a multifunctional switch, turn signal indicators, or the like.

The driver assistance system (DAS) may assist the driver in easily handling (e.g., driving, braking, and steering) the vehicle 10. For example, the DAS may detect peripheral environments (e.g., a peripheral vehicle, pedestrian, cyclist, lane, traffic sign, or the like) of the vehicle 10 (i.e., host vehicle), and may perform driving, braking, and/or steering of the vehicle 10 in response to the detected peripheral environments.

The DAS may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The camera 110 may photograph the front and recognize other vehicles, pedestrians, cyclists, lanes, road signs, and the like.

The forward-view radar 120 and the corner radar 130 may acquire a relative position, a relative speed, etc. of surrounding objects (eg, other vehicles, pedestrians, cyclists, etc.).

Meanwhile, the vehicle 10 may be provided with various sensors for acquiring the behavior information of the vehicle. For example, the vehicle 10 may include a speed sensor for detecting a speed of a wheel, a lateral acceleration sensor for detecting a lateral acceleration of the vehicle, a yaw rate sensor for detecting a change in the angular velocity of the vehicle, a gyro sensor for detecting a tilt of the vehicle, a steering angle sensor for detecting a rotation and steering angle of the steering wheel.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like The controller 300 may include a processor 310 and a memory 320. The controller 300 may include one or more processors 310. The processor 310 generates an image signal processor for processing the front image data of the front camera 110 and/or a digital signal processor for processing the radar data of the radars 120 and 130 and/or a micro control unit (MCU) for generating a braking signal and a steering signal.

The memory 320 may store a program and/or data for the processor 310 to process image data, programs and/or data for processing radar data, and a program and/or data for generating a braking signal and/or a steering signal.

The memory 142 may temporarily store image data received from the forward-view camera 110 and/or radar data received from the radars 120 and 130, and may also temporarily store the processed results of the image data and/or the radar data handled by the processor 310.

The memory 320 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM).

One or more processors included in the controller 300 may be integrated in one chip, or may be physically separated. In addition, the memory 300 and the controller 300 may be implemented as a single chip.

The controller 300 processes image data of the camera 110, forward radar data of the forward-view radar 120, and corner radar data of the plurality of corner radars 130, and generates a control signal for controlling the warning device 210 and the braking device 200 and the steering device 230.

Figure 4:
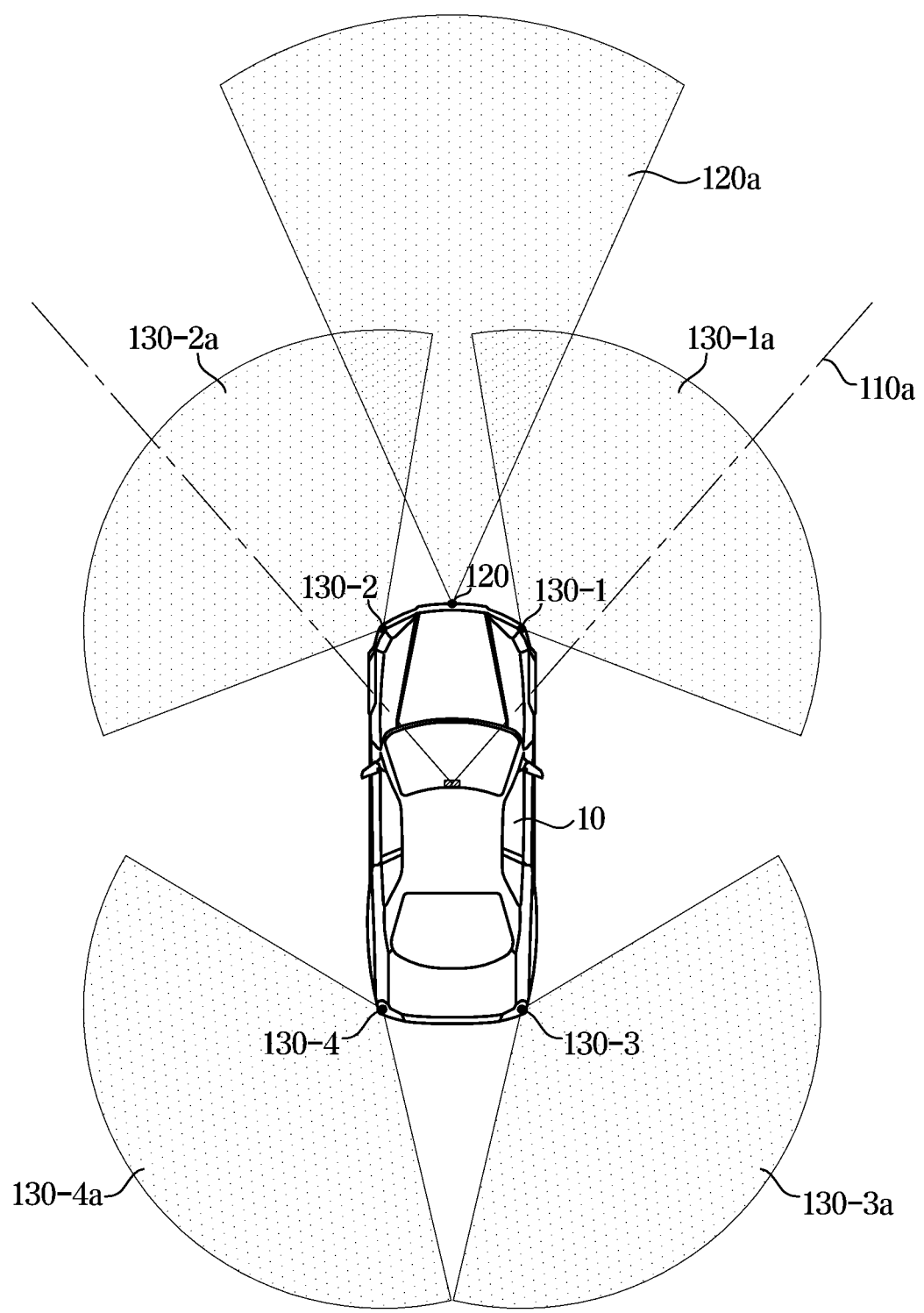
FIG. 4 shows a radar and a camera included in a vehicle in one form of the present disclosure.

FIG. 4 shows a radar and a camera included in a vehicle in some forms of the present disclosure.

Referring to FIG. 4, the camera 110 may have a field of view 110a facing forward. The camera 110 may be installed in, for example, the front windshield of the vehicle 10. The camera 110 may photograph the front of the vehicle 10 and acquire image data of the front of the vehicle 10. The image data in front of the vehicle 10 may include location information about another vehicle or lane located in front of the vehicle 10.

The camera 110 may include a plurality of lenses and an image sensor. The image sensor may include a plurality of photodiodes for converting light into an electrical signal, and the plurality of photodiodes may be arranged in a two-dimensional matrix.

The camera 110 may be electrically connected to the controller 300. For example, the camera 110 is connected to the controller 300 through a vehicle communication network (NT), connected to the controller 300 through a hard wire, or connected to the controller 300 through a printed circuit board (PCB). The camera 110 may transmit image data in front of the vehicle 10 to the controller 300.

The forward-view radar 120 may have a field of sensing 120a facing the front of the vehicle 10. The forward-view radar 120 may be installed in, for example, a grill or bumper of the vehicle 10.

The forward-view radar 120 may include a transmitting antenna (or transmit antenna array) that emits transmit radio waves toward the front of the vehicle 10 and a receiving antenna (or receive antenna array) that receives reflected radio waves reflected from an object. The forward-view radar 120 may acquire the front radar data from the transmitted radio wave transmitted by the transmitting antenna and the reflected radio wave received by the receiving antenna. The front radar data may include distance information and a degree of speed about other vehicles located in front of the vehicle 10. The forward-view radar 120 calculates the relative distance to the object based on the phase difference (or time difference) between the transmission wave and the reflection wave, and calculates the relative speed of the object based on the frequency difference between the transmission wave and the reflection wave.

The forward-view radar 120 may be connected to the controller 300 through, for example, a vehicle communication networks NT or a hard wire or a printed circuit board. The forward-view radar 120 may transmit the front radar data to the controller 300.

The plurality of corner radars 130 may include a first corner radar 130-1 installed at the front right side of the vehicle 10, and a second corner radar 130-2 installed at the front left side of the vehicle 10; and a third corner radar 130-3 installed at the rear right side of the vehicle 10, and a fourth corner radar 130-4 installed at the rear left side of the vehicle 10.

The first corner radar 130-1 may have a sensing field of view 130-1a toward the front right side of the vehicle 10. the second corner radar 132 may have a sensing field of view 130-2a facing forward left of the vehicle 10, the third corner radar 130-3 may have a sensing field of view 130-3a facing rear right of the vehicle 10. The fourth corner radar 130-4 may have a sensing field of view 130-4a facing the rear left side of the vehicle 10.

Each of the plurality of corner radars 130 may include a transmitting antenna and a receiving antenna. The first, second, third and fourth corner radars 130-1, 130-2, 130-3, and 130-4 can acquire each of first corner radar data, second corner radar data, and third corner radar data and fourth corner radar data. The first corner radar data may include distance information and a degree of speed about an object (another vehicle) located on the front right side of the vehicle 10. The second corner radar data may include distance information and a degree of speed of an object located in front left of the vehicle 10. The third and fourth corner radar data may include distance information and speed information of an object located at the rear right side of the vehicle 10 and the rear left side of the vehicle 10.

Each of the corner radars 130 may be connected to the controller 300 through a vehicle communication network NT or a hard wire or a printed circuit board. The first, second, third and fourth corner radars 130-1, 130-2, 130-3, and 130-4 can transmit each of the first, second, third and fourth corner radar data, respectively to the controller 300.

The radars described above may be implemented in Lidar.

Figure 5:
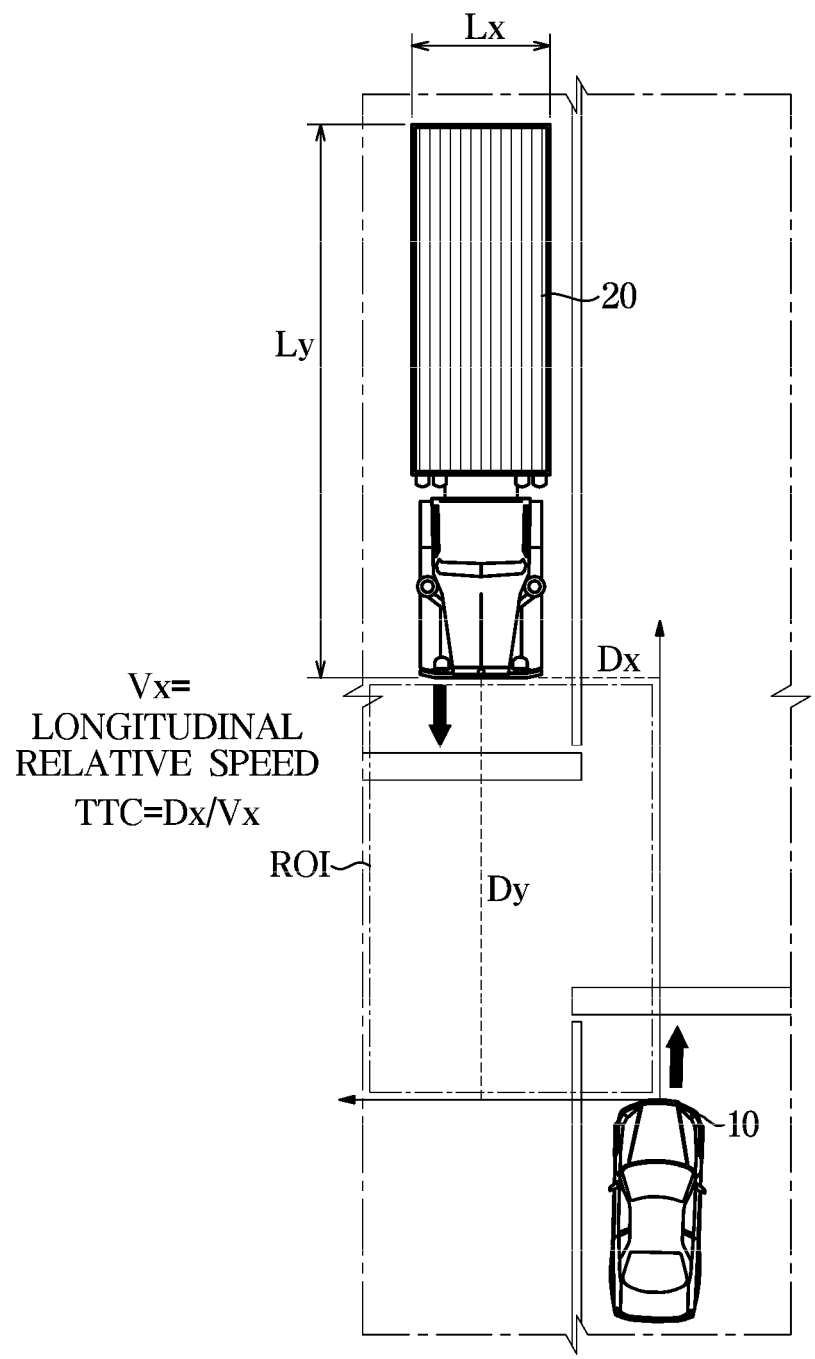
FIG. 5 shows an example of determining a collision risk with other vehicle coming when the vehicle turns at an intersection in one form of the present disclosure.
Figure 6:
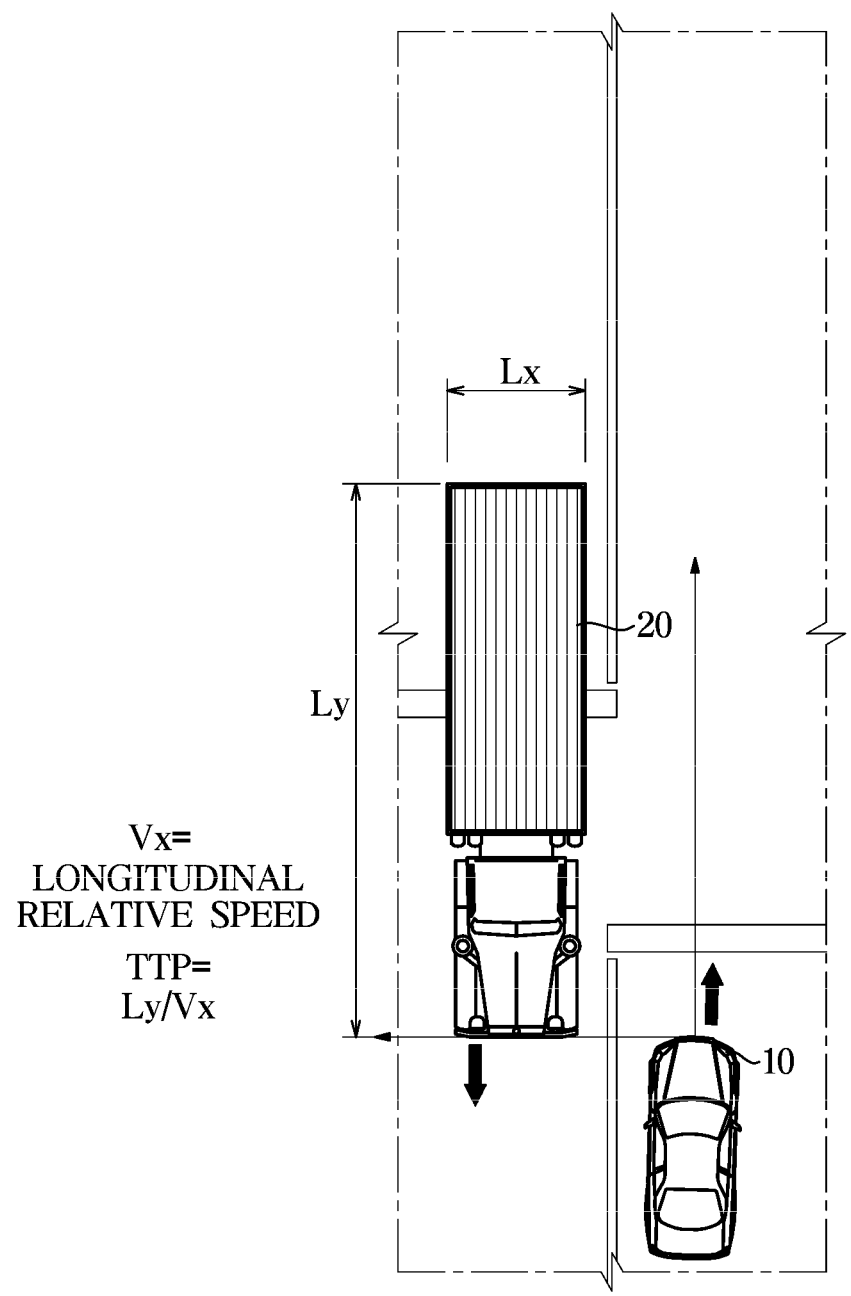
FIG. 6 shows an example of determining a collision risk with other vehicle passing side of the vehicle in one form of the present disclosure.

FIG. 5 shows an example of determining a collision risk with other vehicle coming when the vehicle turns at an intersection in some forms of the present disclosure. FIG. 6 shows an example of determining a collision risk with other vehicle passing side of the vehicle in some forms of the present disclosure.

Referring to FIG. 5, the controller 300 may detect or identify other vehicle 20 oncoming at the intersection based on the image data of the camera 110 and the front radar data of the forward-view radar 120.

The controller 300 may acquire position information (eg, distance and direction) and speed information (eg, relative speed and acceleration) of the other vehicle 20 based on the front radar data of the forward-view radar 120. In addition, the controller 300 may acquire position information (eg, lateral distance) and type information (eg, a truck, a bus, etc.) of the other vehicle 20 based on the image data of the camera 110.

The controller 300 may match the objects detected by the image data to the detected objects by the front radar data, and acquire type information, location information, speed information, etc. of the front objects of the vehicle 10 based on the matching result. The controller 300 may generate a braking signal and a steering signal based on the type information, the position information, and the speed information of the other vehicle 20.

Also, the controller 300 may estimate the width Lx and the height Lz of the other vehicle 20 oncoming the intersection based on the image data of the camera 110. The controller 300 may estimate the overall length Ly of the other vehicle 20 based on the estimated width Lx and the height of the other vehicle 20. Estimating the overall length Ly of the other vehicle 20 will be described in detail later with reference to FIG. 7.

The controller 300 may calculate an estimated time to collision (TTC) with the other vehicle 20 based on the position information (distance) and the speed information (relative speed) of the other vehicle 20 oncoming the intersection.

Specifically, when the other vehicle 20 exists in the region of interest (ROI), the controller 300 may calculate the estimated collision time TTC based on the longitudinal distance Dy with the other vehicle 20 and the longitudinal relative speed Vx of the other vehicle 20. That is, the controller 300 may calculate an estimated collision time TTC, which is a value obtained by dividing the longitudinal distance Dy with the other vehicle 20 by the longitudinal relative speed Vx of the other vehicle 20.

The region of interest ROI refers to a region within a predetermined distance in front of the vehicle 10. For example, the ROI may refer to an area in which the longitudinal distance Dy is within 100 meters from the front of the vehicle 10 and the lateral distance Dx is within the lane width (about 3.6 meters).

The controller 300 may determine the collision risk based on the Time To Collision TTC. The controller 300 may warn the driver of a collision or transmit a braking signal to the braking device 220 based on a comparison result between the anticipated Time To Collision TTC and the predetermined reference time.

The controller 300 controls the warning device 210 to output a collision warning in response to a collision estimated time smaller than a first predetermined reference time (for example, 0.8 seconds), and controls the braking device 220 to brake the vehicle 10 to stop. In addition, the controller 300 may control the warning device 210 to output a collision warning in response to a Time To Collision TTC that is smaller than a second predetermined reference time (for example, 1.2 seconds). The warning device 210 may include at least one of an audio device and a display. The first reference time is less than the second reference time.

Referring to FIG. 6, the controller 300 can obtain position information (distance and direction) and velocity information (relative speed) from the plurality of corner radars 130 which is located on the side of the vehicle 10 (front right, front left, rear right, rear left).

The controller 300 estimates a collision risk on the side of the other vehicle 20 when turning at the intersection based on the image data and the radar data, and based on the collision risk on the side of the other vehicle 20, the braking device 220 can be controlled.

In detail, the controller 300 estimates an overall length Ly of the other vehicle 20 based on the image data and the radar data, and calculates a time to pass (TTP) for the other vehicle 20 to pass. The time TTP (Time to Pass) that the other vehicle 20 passes may be defined as a value obtained by dividing the overall length Ly of the other vehicle 20 by the longitudinal relative speed Vx of the other vehicle 20.

The controller 300 may estimate a time to pass (TTP) that the other vehicle 20 passes from when the other vehicle 20 leaves the region of interest. For example, the controller 300 can estimate the time to pass (TTP) that the other vehicle 20 passes from the time when the longitudinal distance Dy with the other vehicle 20 is the first reference distance (for example, 1 meter).

Meanwhile, when the steering angle exceeds a predetermined reference steering angle (for example, 80 degrees) before the time TTP passes by the other vehicle 20, the controller 300 may assume that there is a collision risk with the side surface of the other vehicle 20. In addition, the controller 300 may control the braking device 220 to release the braking of the vehicle 10 after the time TTP that the other vehicle 20 passes.

The controller 300 may control the warning device 210 to output a collision warning when there is a collision risk on the side of the other vehicle 20. The warning device 210 may include at least one of an audio device and a display. The audio device may output a voice warning message. The display may output a visual warning message.

Figure 7:
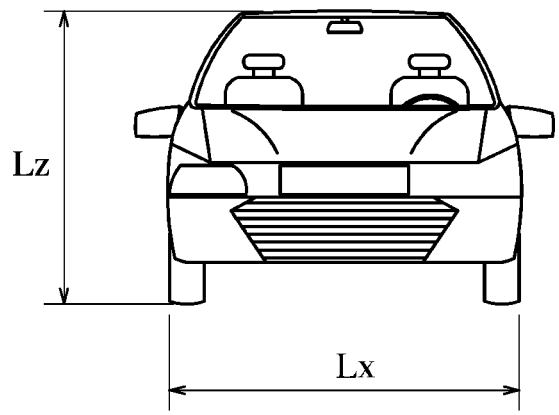
FIG. 7 shows overall length data table used to estimate the type and overall length of other vehicles.

FIG. 7 shows overall length data table used to estimate the type and overall length of other vehicles.

Referring to FIG. 7, the controller 300 may acquire a width Lx and a height Lz of another vehicle 20 facing each other based on the image data of the camera 110. The controller 300 may estimate the overall length Ly of the other vehicle 20 based on the width Lx and the height of the other vehicle 20.

The controller 300 may determine the overall length of the other vehicle 20 with reference to the overall length data table 700 stored in the memory 320. For example, when the width Lx of the other vehicle 20 is 1800 mm and the height Lz is measured as 1440 mm, the controller 300 may determine the overall length of the other vehicle 20 as 4620 mm. have.

In addition, unlike FIG. 7, the controller 300 determines the overall length of the other vehicle as 11000 mm when the width Lx of the other vehicle 20 is 2000 mm or more and the height Lz is 3000 mm or more.

Figure 8:
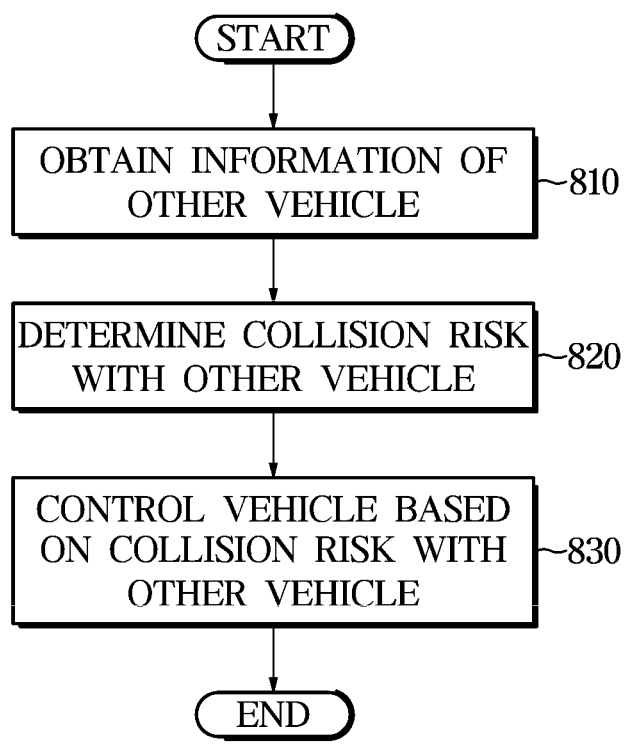
FIG. 8 is a flowchart schematically illustrating a method of controlling vehicle in one form of the present disclosure.

FIG. 8 is a flowchart schematically illustrating a method of controlling vehicle in some forms of the present disclosure.

Referring to FIG. 8, the controller 300 of the vehicle 10 obtains information of another vehicle 20 oncoming at an intersection from the camera 110, the forward-view radar 120, and the corner radar 130 (810). In detail, the controller 300 may acquire position information (distance and direction) and speed information (relative speed) of the other vehicle 20 based on the image data and the radar data. In addition, the controller 300 may acquire a width Lx and a height Lz of the other vehicle 20.

The controller 300 determines a collision risk with the other vehicle 20 based on the obtained information of the other vehicle 20 (820). In detail, the controller 300 estimates a collision risk for at least one of the front of the other vehicle 20 and the side of the other vehicle 20 when the vehicle 10 turns at the intersection.

The controller 300 controls the vehicle 10 based on the degree of collision risk with the other vehicle 20 (830). For example, the controller 300 may brake the vehicle 10 by operating the braking device 220 when there is a collision risk with the other vehicle 20. In addition, the controller 300 may operate the warning device 210 to warn the driver of the collision.

Figure 9:
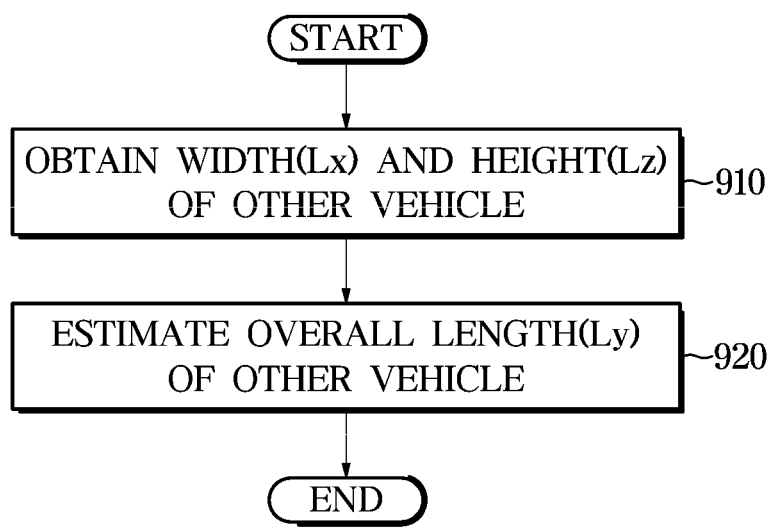
FIG. 9 is a flowchart illustrating a method for estimating the type and overall length of other vehicle.

FIG. 9 is a flowchart illustrating a method for estimating the type and overall length of other vehicle.

Referring to FIG. 9, the controller 300 obtains the width Lx and the height Lz of the other vehicle 20 based on the image data and the radar data (910). The controller 300 estimates an overall length Ly of the other vehicle 20 based on the width Lx and the height of the other vehicle 20 (920). The controller 300 may determine the overall length of the other vehicle 20 with reference to the overall length data table 700 stored in the memory 320.

Figure 10:
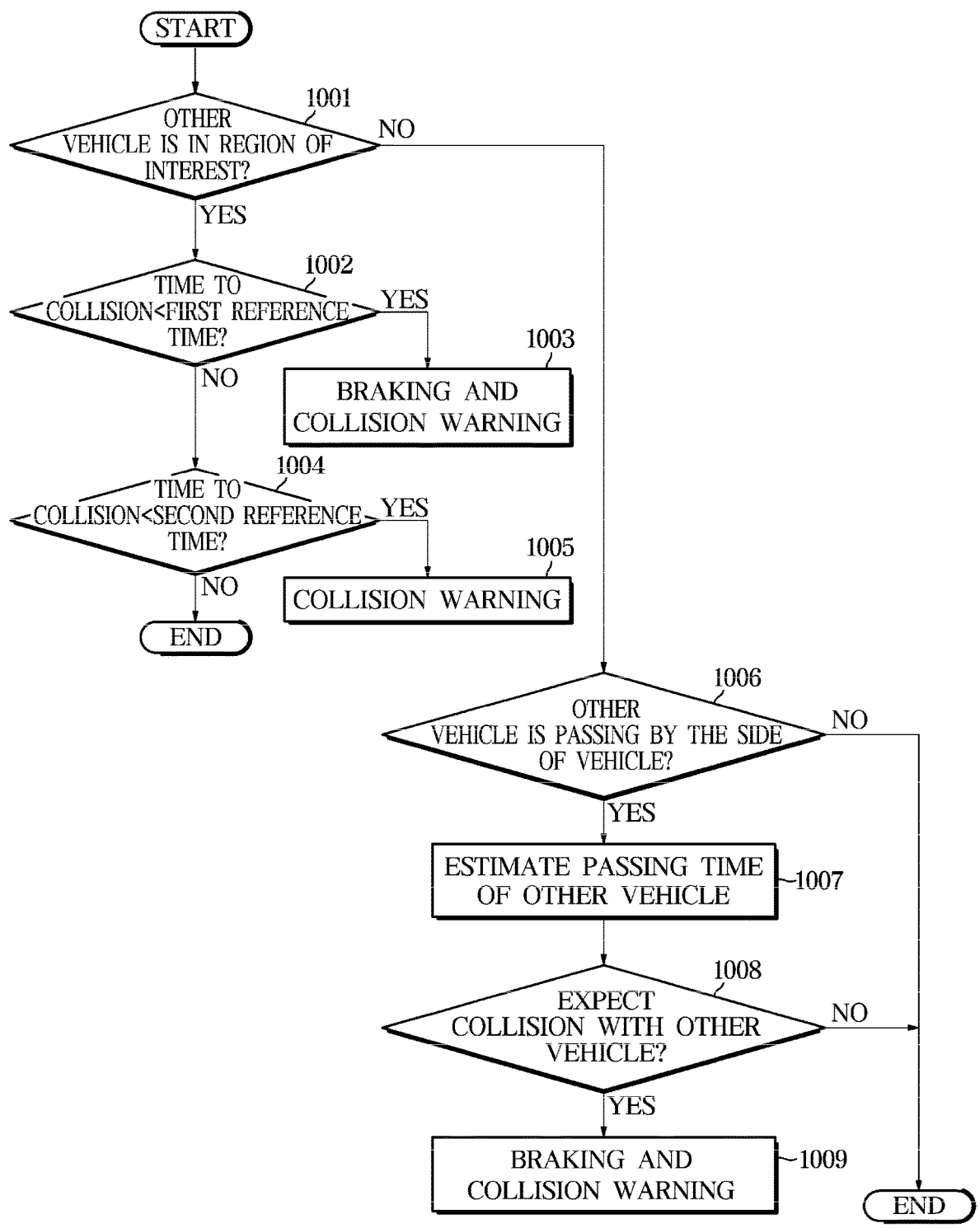
FIG. 10 is a flowchart specifically illustrating a control method of a vehicle in one form of the present disclosure.

FIG. 10 is a flowchart specifically illustrating a control method of a vehicle in some forms of the present disclosure.

Referring to FIG. 10, the controller 300 of the vehicle 10 determines whether the other vehicle 20 oncoming the intersection exists within the ROI based on the image data of the camera 110 and the forward radar data of the forward-view radar 120 (1001). The region of interest ROI refers to a region within a predetermined distance in front of the vehicle 10. For example, the ROI may refer to an area in which the longitudinal distance Dy is within 100 meters from the front of the vehicle 10 and the lateral distance Dx is within the lane width (about 3.6 meters).

The controller 300 controls the warning device 210 to output a collision warning in response to a collision estimated time smaller than a first predetermined reference time (for example, 0.8 seconds), and controls the braking device 220 to brake the vehicle 10 to stop (1002,1003).

In addition, the controller 300 may control the warning device 210 to output a collision warning in response to a Time To Collision TTC that is smaller than a second predetermined reference time (for example, 1.2 seconds) (1004, 1005).

The controller 300 determines whether the other vehicle 20 passes by the side of the vehicle 10 based on the image data and the radar data (1006). For example, the controller 300 may determine that the other vehicle 20 passes by the side of the vehicle 10 when the other vehicle 20 leaves the region of interest. In addition, when the longitudinal distance Dy with the other vehicle 20 is within a first reference distance (for example, 1 meter), the controller 300 may determine that the other vehicle 20 passes by the side of the vehicle 10.

The controller 300 estimates a time to pass (TTP) that another vehicle 20 passes (1006). The controller 300 estimates an overall length Ly of the other vehicle 20 based on the width Lx and the height of the other vehicle 20, and estimates a time to pass (TTP) by other vehicle 20. The time TTP (Time to Pass) that the other vehicle 20 passes may be defined as a value obtained by dividing the overall length Ly of the other vehicle 20 by the longitudinal relative speed Vx of the other vehicle 20. Meanwhile, the controller 300 may estimate a time to pass (TTP) that the other vehicle 20 passes from when the other vehicle 20 leaves the region of interest.

The controller 300 determines whether there is a collision risk with respect to the side of the other vehicle 20 (1007). The controller 300 may determine a collision risk on the side of the other vehicle 20 based on the time TTP that the other vehicle 20 passes, the steering angle of the vehicle 10, and the speed of the vehicle 10. For example, when the steering angle exceeds a predetermined reference steering angle (for example, 80 degrees) before the time TTP passes by the other vehicle 20, the controller 300 may assume that there is a collision risk with the side surface of the other vehicle 20.

The controller 300 may control the warning device 210 to output a collision warning when there is a collision risk on the side of the other vehicle 20, and control the braking device 220 to stop the vehicle 10.

The disclosed vehicle and its control method can prevent collisions on the side of other vehicles by estimating the overall length of other vehicles oncoming the intersection.

Therefore, the disclosed vehicle and its control method can increase driving safety and increase reliability for autonomous driving. In addition, it is possible to cope with the collision situation and reduce the damage.

On the other hand, some forms of the present disclosure may be implemented in the form of a recording medium for storing instructions executable by a computer. Instructions may be stored in the form of program code and, when executed by a processor, may generate a program module to perform the operations of some forms of the present disclosure. The recording medium may be implemented as a computer-readable recording medium.

The computer-readable recording medium includes all kinds of recording media in which instructions that can be decoded by a computer. For example, there may be read only memory (ROM), random access memory (RAM), a magnetic tape, a magnetic disk, a flash memory, an optical data storage device, and the like.

The disclosed vehicle and controlling method thereof can reduce collisions on the side of other vehicles by estimating the overall length of other vehicles coming at an intersection. Therefore, the disclosed vehicle and controlling method thereof can increase driving safety and increase reliability for autonomous driving. In addition, it is possible to cope with the collision situation and reduce the damage.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
    a brake;
    a camera configured to capture an image of a front side of the vehicle and obtain image data;
    a radar configured to obtain radar data including distance information with respect to another vehicle traveling in an opposite direction at an intersection and speed information of the other vehicle; and
    a controller configured to:
        estimate an overall length of the other vehicle and a time to pass (TTP) of the other vehicle based on the image data and the radar data;
        estimate a collision risk on a side of the other vehicle based on the overall length of the other vehicle and the TTP of the other vehicle when the vehicle is turning at the intersection; and
        control the brake based on the collision risk on the side of the other vehicle.

2. The vehicle of claim 1, wherein the controller is configured to:
    determine that the collision risk on the side of the other vehicle is present when a steering angle exceeds a predetermined reference steering angle before the TTP of the other vehicle.

3. The vehicle of claim 1, wherein the controller is configured to:
    obtain a width and a height of the other vehicle based on the image data and the radar data; and
    estimate the overall length of the other vehicle based on the width and the height of the other vehicle.

4. The vehicle of claim 3, wherein the controller is configured to:
    determine the overall length of the other vehicle based on an overall length data table stored in a memory.

5. The vehicle of claim 1, wherein the controller is configured to:
    estimate the TTP of the other vehicle from a time that the other vehicle passes a region of interest.

6. The vehicle of claim 5, wherein the controller is configured to:
    estimate the TTP of the other vehicle from a time that the other vehicle passes a first reference distance that is a longitudinal distance against the other vehicle.

7. The vehicle of claim 1, wherein the controller is configured to:
    release the brake after the TTP of the other vehicle.

8. The vehicle of claim 1, wherein the vehicle further comprises:
    a warning device configured to output a collision warning with the other vehicle.

9. The vehicle of claim 8, wherein the warning device comprises at least one of an audio device outputting a voice warning message or a display outputting a visual warning message.

10. A method for controlling a vehicle, the method comprising:
    capturing, by a camera, an image of a front side of the vehicle and obtaining image data;
    obtaining, by a radar, radar data including distance information with respect to another vehicle traveling in an opposite direction at an intersection and speed information of the other vehicle;
    estimating, by a controller, an overall length of the other vehicle based on the image data and the radar data;
    estimating, by the controller, a time to pass (TTP) of the other vehicle;
    estimating, by the controller, a collision risk on a side of the other vehicle based on the overall length of the other vehicle and the TTP of the other vehicle when the vehicle is turning at the intersection; and
    controlling, by the controller, a brake based on the collision risk on the side of the other vehicle.

11. The method of claim 10, wherein estimating the collision risk on the side of the other vehicle further comprises:
    determining, by the controller, that the collision risk on the side of the other vehicle is present when an steering angle exceeds a predetermined reference steering angle before the TTP of the other vehicle.

12. The method of claim 10, wherein estimating the overall length of the other vehicle comprises:
    obtaining, by the controller, a width and a height of the other vehicle based on the image data and the radar data; and
    estimating, by the controller, the overall length of the other vehicle based on the width and the height of the other vehicle.

13. The method of claim 12, wherein estimating the overall length of the other vehicle further comprises:
    determining, by the controller, the overall length of the other vehicle based on an overall length data table stored in a memory.

14. The method of claim 10, wherein estimating the TTP of the other vehicle comprises:
    estimating, by the controller, the TTP of the other vehicle from a time that the other vehicle passes a region of interest.

15. The method of claim 14, wherein estimating the TTP of the other vehicle comprises:
    estimating, by the controller, the TTP of the other vehicle from a time that the other vehicle passes a first reference distance that is a longitudinal distance against the other vehicle.

16. The method of claim 10, wherein the method further comprises:
    releasing, by the controller, the brake after the TTP of the other vehicle.

17. The method of claim 10, wherein the method further comprises:
   outputting, by a warning device, a collision warning with the other vehicle.

18. The method of claim 17, wherein outputting the collision warning with the other vehicle comprises:
   outputting at least one of a voice warning message by an audio or a visual warning message by a display.

* * * * *